(12) United States Patent
Fischer et al.

(10) Patent No.: US 10,131,369 B2
(45) Date of Patent: Nov. 20, 2018

(54) METHOD FOR DIAGNOSING RAILROAD COMPONENTS OF A RAILROAD NETWORK FOR RAIL TRANSPORT

(71) Applicant: SIEMENS AKTIENGESELLSCHAFT, Munich (DE)

(72) Inventors: Erhard Fischer, Fuerth (DE); Thomas Mueller, Roethebach/Pegnitz (DE); Frank Popp, Fuerth (DE); Dirk Punstein, Nuremberg (DE); Christian Schulze, Nuremberg (DE); Ekkehard Toensing, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 537 days.

(21) Appl. No.: 14/429,213

(22) PCT Filed: Aug. 23, 2013

(86) PCT No.: PCT/EP2013/067508
§ 371 (c)(1),
(2) Date: Mar. 18, 2015

(87) PCT Pub. No.: WO2014/044485
PCT Pub. Date: Mar. 27, 2014

(65) Prior Publication Data
US 2015/0247781 A1    Sep. 3, 2015

(30) Foreign Application Priority Data

Sep. 18, 2012  (EP) ................................. 12184836
Jan. 30, 2013  (DE) ........................ 10 2013 201 488

(51) Int. Cl.
| | | |
|---|---|---|
| B61L 27/00 | (2006.01) |
| G01M 17/08 | (2006.01) |
| G01M 17/03 | (2006.01) |

(52) U.S. Cl.
CPC ......... *B61L 27/0094* (2013.01); *G01M 17/03* (2013.01); *G01M 17/08* (2013.01)

(58) Field of Classification Search
USPC .................................... 701/19, 29.6, 32, 33
See application file for complete search history.

(56) References Cited

U.S. PATENT DOCUMENTS

| | | |
|---|---|---|
| 5,445,347 A | 8/1995 | Ng |
| 6,125,311 A | 9/2000 | Lo |
| 2010/0204857 A1 | 8/2010 | Forrest et al. |

FOREIGN PATENT DOCUMENTS

| | | |
|---|---|---|
| CN | 102320316 A | 1/2012 |
| EP | 1900597 A1 | 3/2008 |

(Continued)

*Primary Examiner* — Lam Nguyen
(74) *Attorney, Agent, or Firm* — Laurence Greenberg; Werner Stemer; Ralph Locher

(57) ABSTRACT

A method and a system for diagnosing the operating state of one or more railroad components of a railroad network for rail transport. The railroad components each have at least a first measuring device for measuring first measurement values of at least one measurement variable for describing the operating state of the railroad component. The novel method includes the following steps: measuring the first measurement values by way of the first measuring device; measuring additional, second measurement values, which are independent of the operating state of the railroad components, by way of at least one additional, second measuring device; transmitting the measurement values to a control center situated along the tracks; evaluating the measurement (Continued)

values in the control center by way of a predefined algorithm, and providing at least one result of the evaluation as an output.

9 Claims, 1 Drawing Sheet

(56) References Cited

FOREIGN PATENT DOCUMENTS

| | | | |
|---|---|---|---|
| GB | 2437156 | A | 10/2007 |
| RU | 2444449 | C1 | 3/2012 |

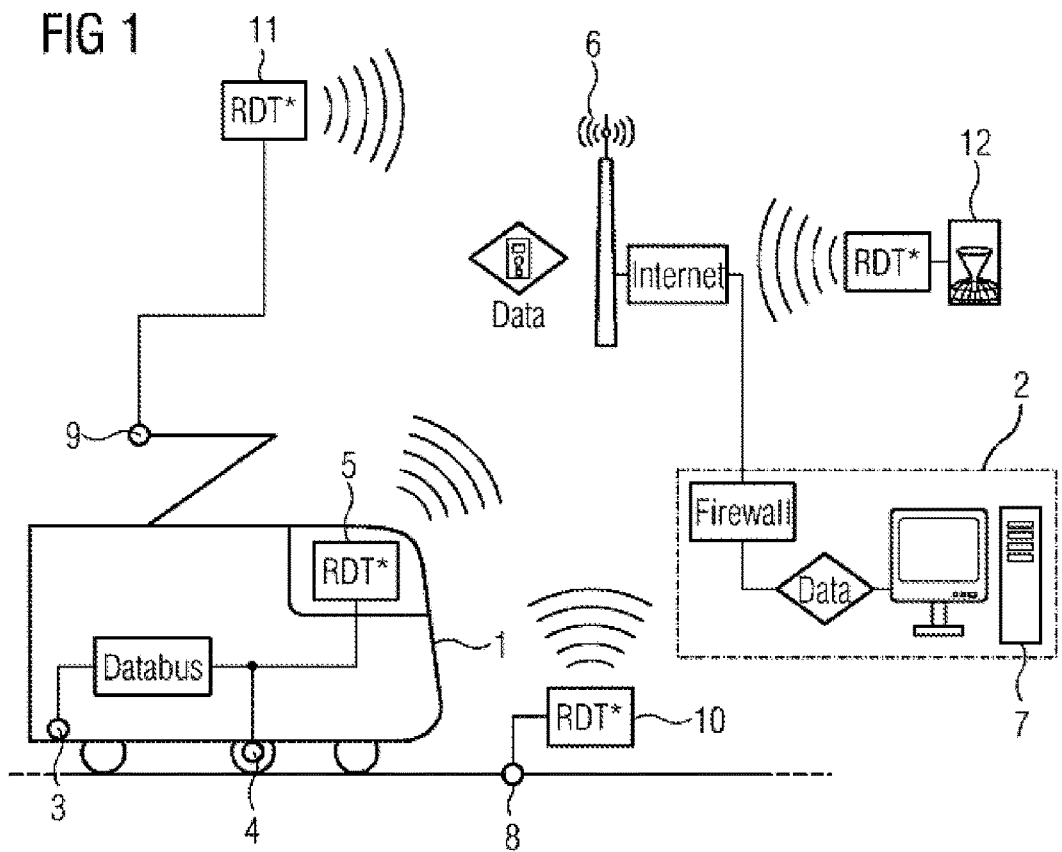
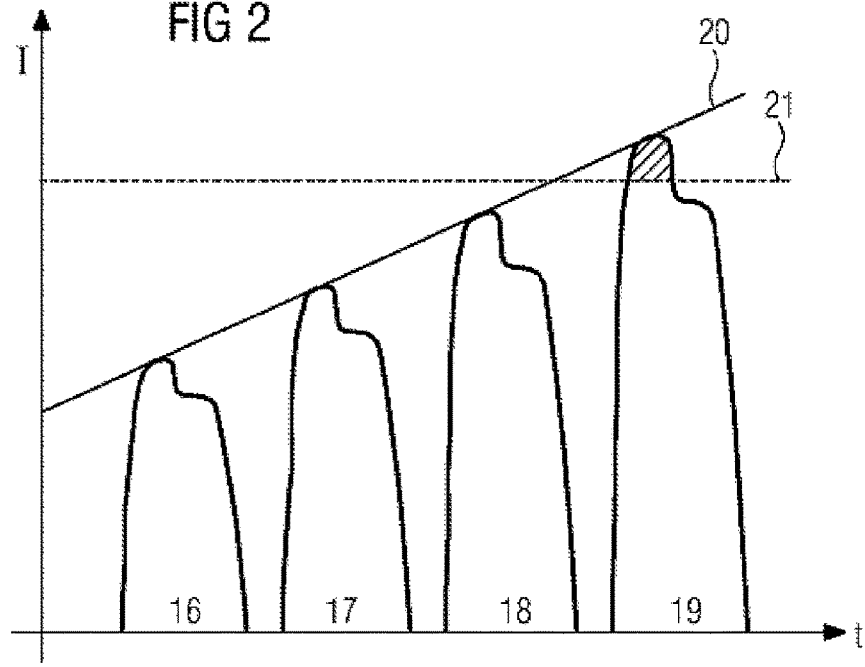

METHOD FOR DIAGNOSING RAILROAD COMPONENTS OF A RAILROAD NETWORK FOR RAIL TRANSPORT

BACKGROUND OF THE INVENTION

Field of the Invention

The invention relates to a method and a system for diagnosing an operating state of one or more railroad components of a railroad network for rail transport, which railroad components each comprise at least one measuring device for recording measured values of at least one measurement variable, the operating state being characterized by at least one measurement variable.

Railroad components of a railroad network for rail transport which have measuring devices for recording measured values of a measurement variable have become known. For example, a current measuring device is arranged at a switch in order to record measured values of a motor current for setting the switch. The measured values are then evaluated by comparing each of them with a predefined threshold value, for example. If a measured value of the railroad component exceeds the threshold value, a malfunction of the railroad component is inferred.

BRIEF SUMMARY OF THE INVENTION

The invention is based on the object of proposing a method and a system for making precise predictions for maintenance.

The object is achieved by the subject matters of the independent patent claims. Developments and refinements of the invention are found in the features of the dependent patent claims.

A method according to the invention for diagnosing the operating state of one or more railroad components of a railroad network for rail transport, which railroad components each comprise at least one first measuring device for recording first measured values of at least one measurement variable which are used to describe the operating state of the respective railroad component, comprises the following method steps of:

recording first measured values using the at least one first measuring device of the at least one railroad component, recording further, second measured values which are independent of the operating state of the at least one railroad component using at least one further, second measuring device, transmitting at least the first of the measured values to a control center arranged on the line, evaluating the first measured values in the control center using a predefined algorithm taking into account the second measured values, and providing at least one result of the evaluation for output.

At least one railroad component of a railroad network for rail vehicles, in particular suitable for passenger transport, comprises at least one first measuring device, occasionally also referred to as a measuring sensor. This measuring device is arranged, in particular, in or on the railroad component. The following are cited here as a non-exhaustive list of measuring devices: current/voltage recording, temperature sensor and/or position sensors.

The first measured values recorded by the first measuring device of the at least one railroad component are dependent on an operating state or a change in the operating state of the at least one railroad component and are therefore used to describe the operating state. The operating state of the at least one railroad component fully describes the properties of the railroad component at a predefined time provided that said properties are not already tied up with the unchangeable properties of the railroad component as such. In addition to the first measured values for the measurement variable, further information may be needed in order to fully describe the properties of the railroad component at the predefined time.

In contrast, the further, second measured values are recorded by the second measuring device independently of the operating state or changes in the operating state of the at least one railroad component. In this case, the second measuring device is arranged, for example as part of a measuring point, in a manner free from the at least one railroad component, in particular at a distance from the latter. The second measuring device need not necessarily be stationary; it is arranged on a vehicle, in particular a rail vehicle, for example. In particular, however, the second measuring device(s) is/are immovable measuring devices arranged on the line. The second measured values may be recorded, for example, by a central point, such as the weather service, and relate to the immediate or mediate environment of the railroad component.

These further, second measured values are measured values for the at least one measurement variable for which the first measured values of the railroad component are also recorded, and/or the further, second measured values are measured values for further measurement variables. The second measured values are independent of the values of the first measured values. The opposite case does not necessarily apply. For example, a temperature sensor, as a first measuring device of the railroad component, records measured values of the measurement variable of the temperature of the railroad component. A temperature sensor which is free from and independent of the railroad component, for example positioned in the vicinity of the railroad component, in turn records the temperature of the air in its environment. The temperature of the railroad component increases on the basis of the increasing temperature of the air in the environment. In contrast, an increasing temperature of the railroad component only insignificantly influences the temperature of the air in the environment and can therefore be ignored—the temperature of the air in the environment is considered to be independent of the temperature of the railroad component in this illustrative example.

In addition to the first measured values, the second measured values may likewise be transmitted to the control center and concomitantly included in the evaluation of the first measured values. On the other hand, the second measured values may also be evaluated separately from the first measured values in a previous method step and only a result of this evaluation is taken into account when evaluating the first measured values using the predefined algorithm. For example, a plurality of second measured values are recorded for measurement variables for describing the weather such as temperature, pressure or humidity. A weather forecast is derived therefrom. The evaluation of the second measured values can therefore result in predictions for temperature values which are taken into account when evaluating the first measured values. The first measured values are therefore evaluated in the control center using the predefined algorithm in indirect or direct dependence on the second measured values.

According to one development of the invention, both the first measured values and the second measured values are evaluated using the predefined algorithm. In any case, the at least one result of the evaluation is dependent on the first and on the second measured values.

Many different algorithms can be used for evaluation. According to one exemplary embodiment of the invention, the predefined algorithm may be suitable for the trend analysis of a measurement series of at least first measured values of a predefined measurement variable. If the temperature changes with time, it can hereby be predicted when a predefined limit temperature is likely to be exceeded. Further exemplary algorithms are contained in the following, open, non-exhaustive list: frequency analysis, current profile, voltage profile, transit time.

The first measured values are transmitted from the railroad component to the control center in a wireless manner, for example. Wireless transmission is carried out at least in sections in this case, that is to say the transmission need not be wireless over the entire path from the railroad component to the control center. Wireless transmission is carried out, for example, using a remote data transmission link, such as using a GSM, UMTS or LTE network, between the railroad component and a transmitting and receiving system of this network. The further transmission of the measurement data can also be carried out in a wired manner between the receiving system and the control center. In a development, the first measured values are transmitted from the railroad component to the control center in a predefined cycle. In particular, the first measured values are transmitted from the railroad component to the control center in a manner free of predefined operating states or changes in the operating state of the railroad component. In order to transmit the first measured values from the railroad component to the control center, the railroad component has a transmitter and the control center has a receiver. Instead of transmission, reference may also be made to transfer. The transmitter and receiver are complementary to one another. The control center is arranged on the line and therefore on land and is arranged, in particular, in a stationary manner and remote from the railroad component.

In a similar manner to the transmission of the first measured values, the second measured values may also be transmitted from the at least one further, second measuring device to the control center, in particular in a cyclical manner. If first and second measured values are cyclically transmitted, the cycle may be identical. In contrast, if the second measured values are recorded by a second measuring device in the control center, transmission appears to be irrelevant. Wireless transmission of the second measured values to the control center is naturally likewise possible. There, the measured values are evaluated using a predefined algorithm. For this purpose, the control center has, in particular, a controller which is suitable for evaluating the first and possibly the second measured values using the predefined algorithm. The algorithm is advantageously in the form of software. This harbors the advantage of simple and quick adaptation of the algorithm. The algorithm and the measured values may be held in a memory, as can intermediate results of the evaluation. The evaluation leads to at least one result. This at least one result is provided by the control center.

It is additionally transmitted to a rail vehicle and output there in predefined form, for example visualized, and/or the evaluation result is output on the line, in particular in the control center, in predefined form, for example visualized. Alternatively, output for the customer is also possible. The evaluation result can also be made available via the Internet in order to have recourse thereto from different locations. Visualization is effected as a display on a screen, for example. In addition to visualization, acoustic output, tactile feedback and SMS also come into consideration as further output forms. The result of an evaluation of the first and second measured values using the predefined algorithm may as such assume a plurality of corresponding forms. It may be a simple stop signal which is output to the driver of the rail vehicle as an acoustic alarm. On the other hand, it may be a diagnosis or failure prediction for the at least one railroad component, which is output to a maintenance team in order to create a maintenance plan for the railroad component. A service life prediction is mentioned here as a further example. The method is suitable for predictive maintenance and is therefore suitable for making predictions on the likelihood of a technical failure of a railroad component and/or for planning corresponding maintenance intervals in order to prevent said failure.

In order to transmit the result from the control center to the rail vehicle, the control center and the rail vehicle have transmitting and receiving systems which are complementary to one another. The results are then wirelessly transmitted from the control center arranged on the line to the rail vehicle, in particular on a section-by-section basis.

In addition to the possibility of locally unrestricted access to the result, the provision of the result by the control center has the additional advantage of temporally unlimited access. According to another embodiment, a plurality of results at different times are stored in the control center for a predefined period and are provided for output. On the one hand, the memory therefore need not be carried in the rail vehicle. On the other hand, one or more results can also be output on the basis of events as well as on the basis of the evaluation result itself or on the basis of states or state changes of the railroad component. This is also referred to as event-controlled.

If, for example, the evaluation pursues the aim of determining the instantaneous, safe operational efficiency of the railroad component, the evaluation result may be "positive" or "negative". The result itself is provided by the control center even if it is "positive". However, the result "positive" is not transmitted and/or output; only a result "negative" is transmitted and/or output, for example in the form of a "stop signal" for the vehicle driver. The output of at least one result and/or the transmission of at least one result from the control center to at least one rail vehicle may therefore depend on the output of the evaluation. In contrast, first measured values are transmitted from the railroad component to the control center in a manner free from predefined states or state changes of the railroad component. Therefore, this is not event-controlled transmission but rather is cyclical transmission. The second measured values can likewise be cyclically transmitted in a similar manner.

According to another development of the method according to the invention, the railroad network comprises at least one group of identical railroad components, first measured values for at least one predefined measurement variable being recorded for each of the identical railroad components using in each case at least one first measuring device of each railroad component, the recorded first measured values being transmitted from the railroad components to a control center arranged on the line, the recorded first measured values being evaluated in the control center using the predefined algorithm, and at least one result of the evaluation being provided by the control center for output.

As simple evaluation using the predefined algorithm, the measured values from the identical railroad components are compared with one another in the control center. A defective state of one of the identical railroad components can then be inferred if a measured value of the railroad component differs from the other measured values of the other identical railroad components at least by a predefined amount.

The measured values for the identical railroad components, which are compared with one another, are recorded at the same time, in particular.

According to another development, a signal is output if a measured value of a railroad component differs from the other measured values of the other identical railroad components by at least the predefined first amount. The signal may assume, for example, the form of an acoustic alarm or a visual display. Another signal generates, for example, a deadline within a predefined time limit in a maintenance timetable for the railroad component.

In order to compare the measured values from the identical railroad components, the following method steps may be carried out, for example, in the control center:
  storing the first measured values transmitted from the railroad components to the control center,
  calculating spacings between the first measured values,
  comparing the spacings with the predefined first amount.

A defective state of a first railroad component is inferred and a signal is possibly output if the spacing between a first measured value of the first railroad component and a first measured value of a further, identical, second railroad component exceeds a predefined first amount.

In addition to simply determining the spacings between the individual, simultaneously recorded first measured values of the identical railroad components, many other algorithms are conceivable in order to detect a difference between at least one measured value and the other measured values. Known algorithms for this purpose are, for example, the determination of the individual residuals for a model function obtained by the least squares method, the determination of the individual differences from the expected value and further statistical analysis models.

Furthermore, a plurality of amounts may be predefined in order to draw different conclusions in the event of a difference and to output corresponding results, if necessary. If at least one first measured value differs by a first amount, only maintenance to be carried out can be displayed; in contrast, in the case of a difference by a second amount, imminent failure of the corresponding railroad component can be displayed and a warning of this can be given using a signal.

According to another development, at least the first amount is predefined on the basis of the further, second measured values for the measurement variable and/or for one or more further measurement variables, which further, second measured values are recorded using the at least one further, second measuring device which is independent of the railroad components and therefore also independent of the operating states of the railroad components, and which further, second measured values are also naturally recorded independently of the operating states of the identical railroad components. Measurement variables for which first measured values and/or second measured values can be recorded are, for example, speed, rotational speed, current and/or voltage, temperature, pressure or acceleration. Corresponding measuring devices should be provided in a comparable manner. Rotational speeds and/or temperatures can be recorded, for example, by motors, transmissions or wheels.

According to one illustrative example, the spacings between the individual first measured values of the identical railroad components for the measurement variable which characterizes the operating states of the railroad components are calculated. If the measurement variable is the temperature and the corresponding first measured values are recorded for the identical railroad components which are each positioned at comparable locations in the railroad network, the predefined first amount is independent of an ambient temperature of the railroad components since, with a rising ambient temperature, all measured values for the identical railroad components are likewise shifted upward. However, if the identical railroad components are positioned at highly different locations in or on the railroad network, the ambient temperature may have an influence on the first measured values of the temperature of the individual railroad components. The first measured values of the temperature of a first railroad component may be significantly raised, in the case of a substantially higher ambient temperature around the first railroad component, in comparison with a second railroad component in the case of a substantially lower ambient temperature around the second railroad component. In addition, it is also possible to take into account measured values for other measurement variables. For example, the temperature of a railroad component arranged in the open is substantially dependent on the solar radiation in contrast to a railroad component which is arranged in the shade but is otherwise identical. At least one first amount or further amounts may be predefined for each first measured value for the predefined measurement variable of the identical railroad components on the basis of second measured values for one or more further measurement variables and/or on the basis of measured values for the same measurement variable which are recorded independently of the identical railroad components. The first amounts may therefore differ from one another from measured value to measured value for the predefined measurement variable of the identical railroad components and/or from associated railroad component to railroad component.

If identical railroad components now each have two temperature sensors, a first temperature sensor at a first location in each railroad component and a further, second temperature sensor at a second location, which is different from the first location, in each railroad component, only the first measured values from the first temperature sensors may be compared with one another and, in a similar manner, the first measured values from the second temperature sensors. However, this is not absolutely necessary. All first measured values for the predefined measurement variable and, as already stated above, also further, second measured values for the same and/or other measurement variables may likewise be compared with one another in order to infer a defective state of a railroad component by comparing second measured values for further measurement variables with the first measured values for the predefined measurement variable in order to derive the predefined first amount therefrom.

As already stated, not only the first measured values for the identical railroad components, which are compared with one another, but also the second measured values are recorded at the same time. This does not exclude outliers of a measurement series being filtered out from successive measured values or the measurement series being smoothed.

The central evaluation of the measured values from a plurality of railroad components means that a maintenance sequence for the railroad components can be very easily stipulated.

A railroad component for carrying out the method according to the invention therefore comprises at least one first measuring device for recording first measured values of at least one measurement variable and at least one transmitter for transmitting the measured values from the railroad component to the control center. A measuring sensor is considered to be an equivalent designation for a measuring device.

A further measuring point which is independent of the railroad component comprises at least one further, second measuring device for recording further, second measured values which are independent of the operating state of the railroad component and a transmitter for transmitting the measured values from the further measuring point to the control center. In a development, the at least one further, second measuring device is arranged at a distance from the at least one railroad component. In this case, the distance is selected to be so large that the second measured values are independent of the operating state of the railroad component and, as a result, are independent of the values of the first measured values, in particular.

In contrast, a control center for carrying out the method according to the invention comprises at least one receiver for transmitting the measured values from the railroad component to the control center and at least one controller for evaluating the first measured values using a predefined algorithm taking into account the further, second measured values. If appropriate, the controller is suitable for evaluating the first and second measured values using the predefined algorithm.

In a development, the controller is suitable for evaluating the first measured values using algorithms which are different from one another. The algorithms are in the form of software, for example. They can be easily replaced and/or changed. The controller may in future be suitable for processing further, second measured values which are recorded using the further, second measuring devices which are independent of the railroad component.

A system or an apparatus for carrying out the method according to the invention is formed from at least one railroad component of the type mentioned, a measuring point of the type mentioned and at least one control center of the type mentioned. It may also comprise at least one memory which stores the algorithms and which can be accessed by the controller. It may also have at least one means, for example an input device, in particular a so-called man-machine interface, for changing the predefined algorithm. The controller is then suitable for evaluating the first and second measured values using algorithms which are different from one another.

The invention allows numerous embodiments. It is explained in more detail using the following figures which each illustrate an exemplary configuration. Identical elements in the figures are provided with identical reference symbols.

BRIEF DESCRIPTION OF THE SEVERAL VIEWS OF THE DRAWING

FIG. 1 schematically shows a system comprising two railroad components, a rail vehicle and a control center for carrying out the method according to the invention, FIG. 2 shows a trend analysis.

DESCRIPTION OF THE INVENTION

FIG. 1 schematically illustrates a system comprising a railroad network, a rail vehicle 1 and a control center 2.

The rail vehicle 1 has different or identical vehicle components and at least one second measuring device 3, 4 in each case for recording second measured values for at least one predefined measurement variable for each vehicle component, for example a speedometer for recording the current speed of the rail vehicle 1. The rail vehicle 1 also comprises a transmitter 5 for transmitting the second measured values to the control center 2. The second measured values are transmitted from the second measuring devices 3, 4 to the transmitter 5 via a data bus in the rail vehicle 1.

The control center 2 in turn comprises a receiver 6 for receiving the measured values from the rail vehicle 1. It goes without saying that the transmitter 5 and the receiver 6 are compatible with one another. In this case, the receiver 6 is illustrated as a base station of a mobile radio network arranged at a distance from the control center 2. The stationary control center 2 therefore has a multiplicity of possible receivers. The measured values transmitted from the rail vehicle 1 to the receiver 6 are transmitted, in this exemplary configuration, from the receiver 6 to the at least one controller 7 in the control center via the Internet for the purpose of comparing the measured values.

In addition to the measured values for the vehicle components, which are recorded by the second measuring devices 3, 4, first measured values are taken into account by the controller 7 for the purpose of the evaluation.

In this case, the first measured values are recorded from the infrastructure of the rail vehicle 1, in particular from the track and the catenary, by first measuring devices 8, 9 and are transmitted to the control center 2 using further transmitters 10, 11. All of the first measured values are transmitted in encrypted form, in particular. However, further, possibly unencrypted second measured values, for example relating to the weather, can also be included in the evaluation and can be taken into account as a result. In this case, the reference symbol 12 outlines additional measured value sources, for example a weather service. For the rest, RDT* stands for Remote Data Transfer.

FIG. 2 uses a graph to illustrate a simple trend analysis as an example of an algorithm for evaluating measured values. A temporal profile of a motor current of a motor for opening and closing a switch as a railroad component is plotted over successive switch opening cycles. The measured values for three switch opening cycles 16, 17 and 18 are evaluated in the control center. A motor current profile 19 can be predicted for the next switch opening cycle. Additionally or alternatively, a trend (illustrated by the straight line 20) can be calculated. If a threshold value 21 is predefined, in particular on the basis of further, second measured values which are not considered any more closely here, the exceeding of which by the motor current indicates a defective state of the switch, the result of the trend analysis is that the motor current is likely to exceed the threshold value in the next switch opening cycle. This can be output as the evaluation result. However, the evaluation could further advise the shutdown of the switch in order to avoid damage and/or could enter the maintenance of the switch in a maintenance plan. The output of the evaluation result may also involve the switch being automatically deactivated without the assistance of personnel.

The invention claimed is:
1. A method for diagnosing the operating state of at least one railroad component of a railroad network for rail transport, the railroad component having at least one first measuring device for recording first measured values of at least one measurement variable describing the operating state of the railroad component, the method comprising the following steps:

recording the first measured values using the first measuring device;

recording further, second measured values that are independent of the operating state of the railroad component using at least one further, second measuring device;

transmitting the first measured values to a control center arranged along a respective line;

evaluating the first measured values in the control center using a predefined algorithm in direct dependence on the second measured values; and providing a result of the evaluation for output.

2. The method according to claim 1, which comprises transmitting the evaluation result to a rail vehicle, and outputting the evaluation result on the rail vehicle.

3. The method according to claim 1, which comprises outputting the evaluation result on the line.

4. The method according to claim 1, which comprises cyclically transmitting the first measured values to the control center.

5. The method according to claim 1, which comprises transmitting the first measured values wirelessly to the control center.

6. The method according to claim 1, wherein the predefined algorithm is suitable for a trend analysis of the first measured values.

7. The method according to claim 1, wherein the measurement variables for which first and/or second measured values are recorded are selected from the group consisting of: a speed of the rail vehicle, an acceleration of the rail vehicle, a rotational speed of a drive motor, an electrical motor current, an electrical voltage of a motor, and a thermodynamic temperature of a transmission.

8. A system for diagnosing an operating state of a railroad component, comprising:

a control center;

the railroad component having a first measuring device for recording first measured values of at least one measurement variable describing the operating state of the railroad component;

at least one further measuring location with at least one further, second measuring device for recording further, second measured values of at least one measurement variable which are independent of the operating state of said railroad component, said at least one further, second measuring device arranged at a distance from said railroad component;

a transmitter for transmitting the first measured values from said railroad component to said control center;

said control center having at least one receiver for transmitting the first measured values from said first measuring device of the railroad component to said control center and at least one controller for evaluating the first measured values using a predefined algorithm in direct dependence on the second measured values.

9. The system according to claim 8, wherein said controller is configured for evaluating the first measured values using a plurality of mutually different, predefined algorithms.

* * * * *